No. 672,711. Patented Apr. 23, 1901.
W. H. REID.
KINETOGRAPHIC APPARATUS.
(Application filed Jan. 14, 1901.)
(No Model.) 5 Sheets—Sheet 4.

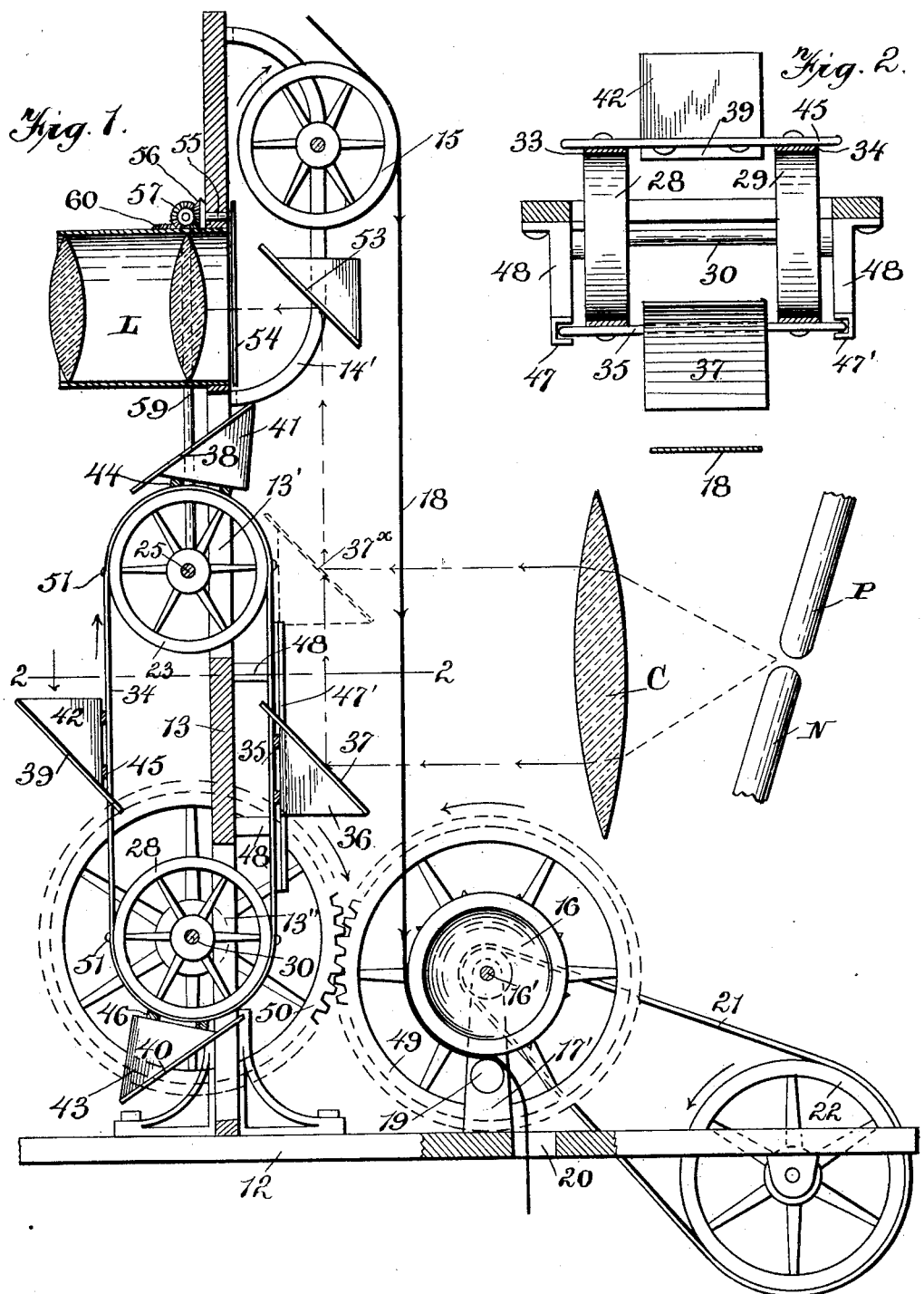

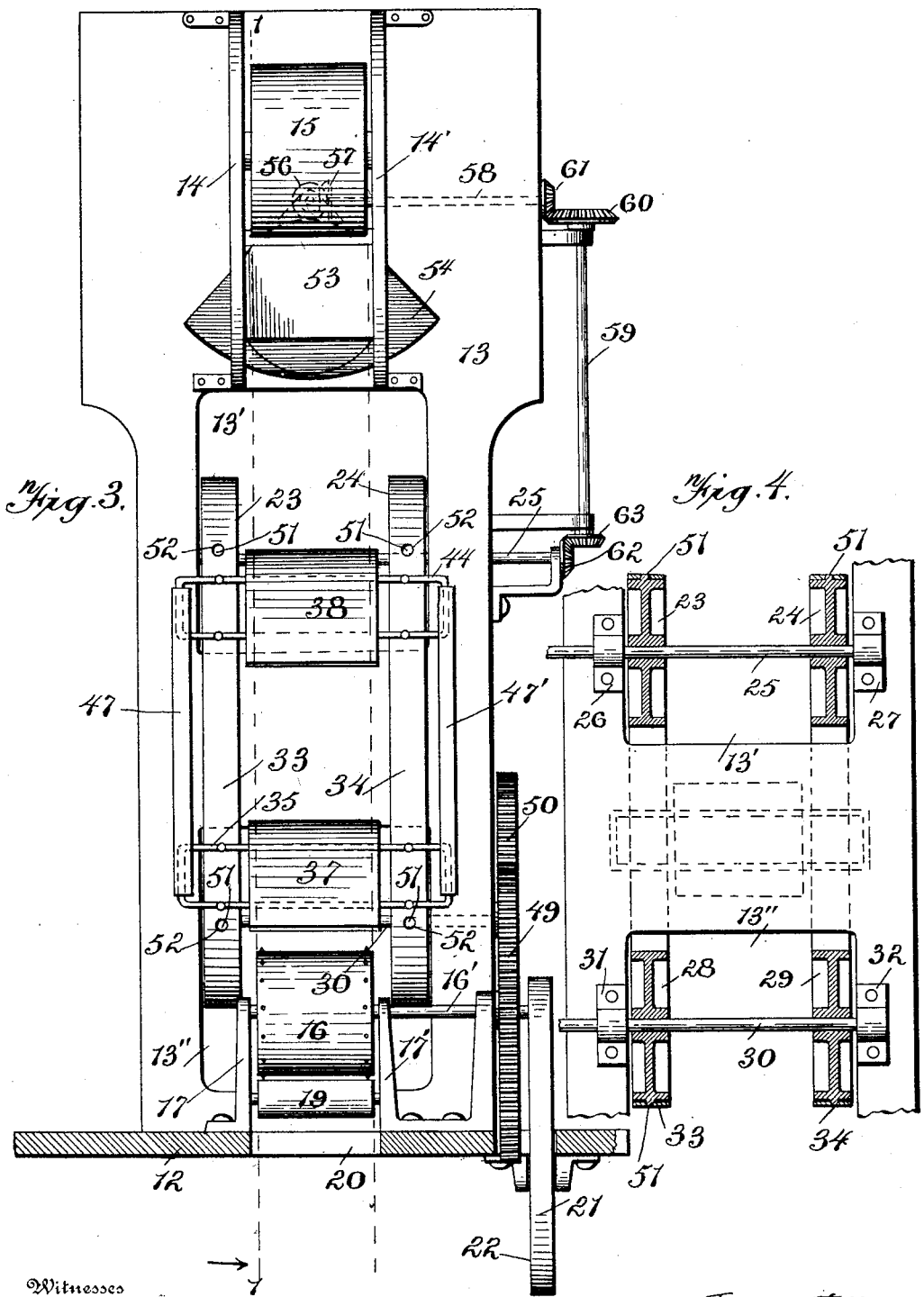

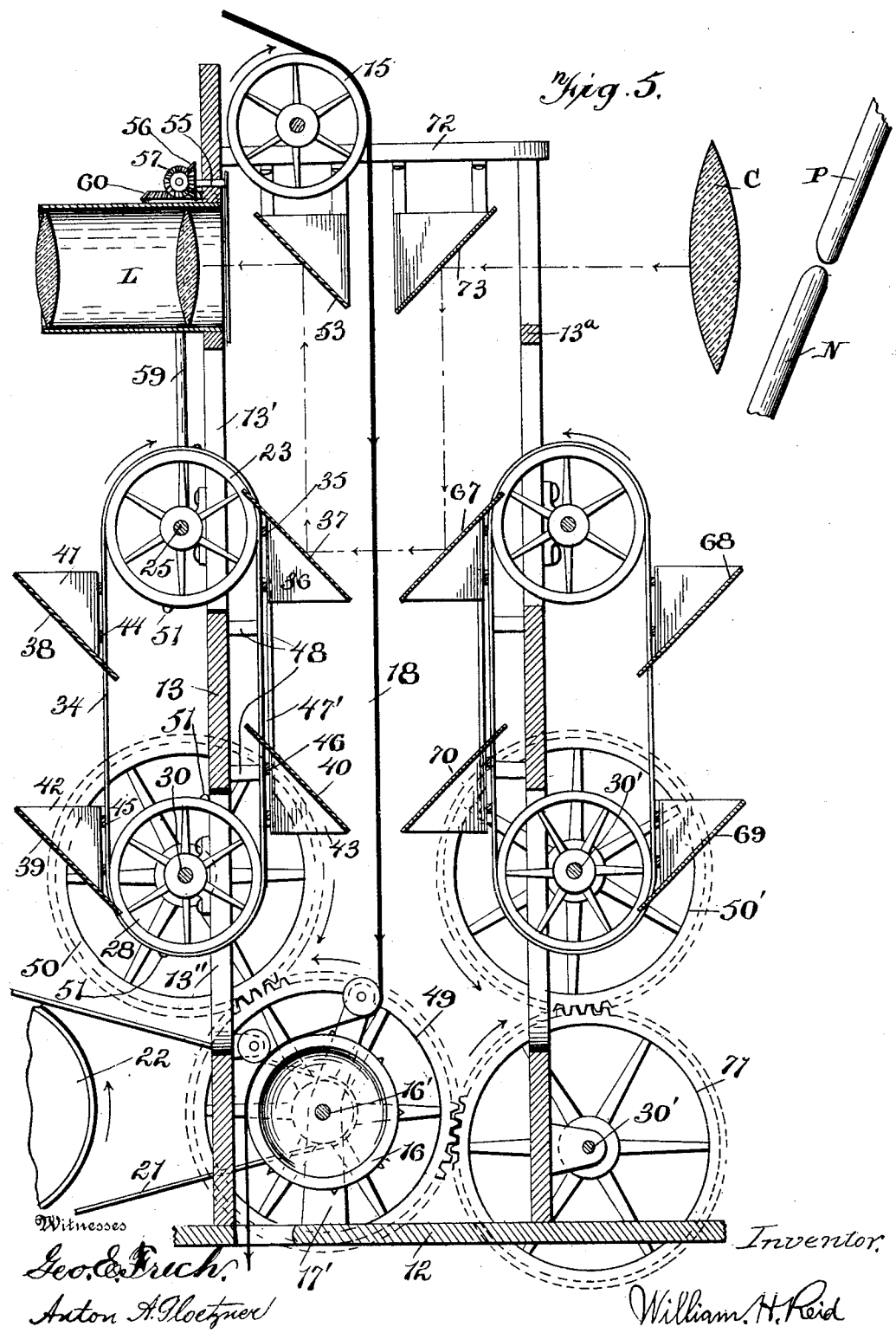

Witnesses
Geo. E. Frech.
Anton A. Gloetzner.

Inventor
William H. Reid.

No. 672,711. Patented Apr. 23, 1901.
W. H. REID.
KINETOGRAPHIC APPARATUS.
(Application filed Jan. 14, 1901.)
(No Model.) 5 Sheets—Sheet 5.
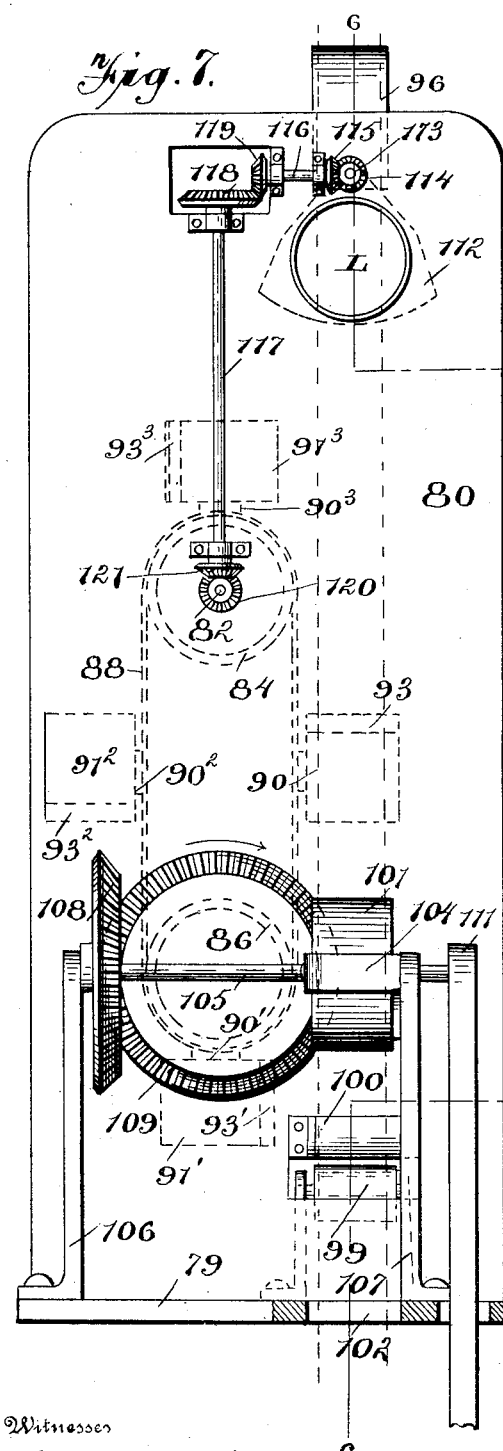
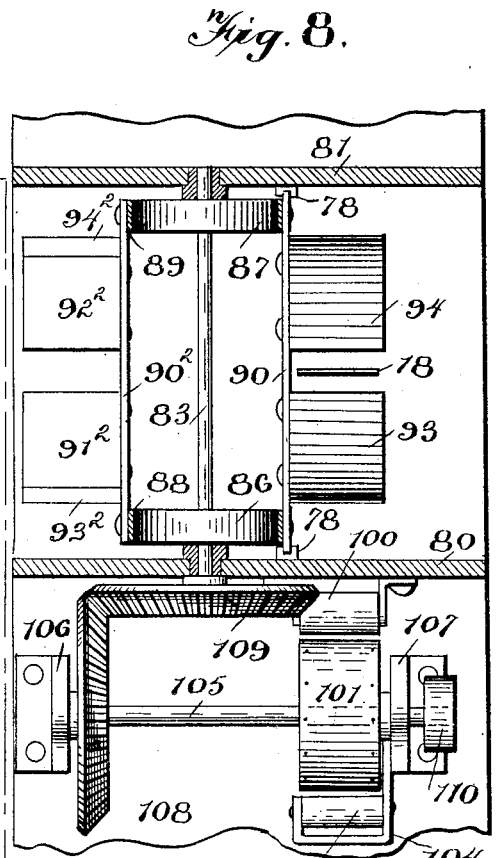
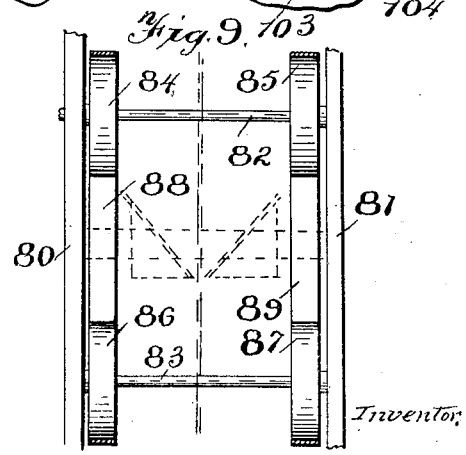
Witnesses
Geo. E. Fuch.
Anton A. Koetzner.
Inventor
William H. Reid.

United States Patent Office.

WILLIAM H. REID, OF WASHINGTON, DISTRICT OF COLUMBIA.

KINETOGRAPHIC APPARATUS.

SPECIFICATION forming part of Letters Patent No. 672,711, dated April 23, 1901.

Application filed January 14, 1901. Serial No. 43,230. (No model.)

*To all whom it may concern:*

Be it known that I, WILLIAM H. REID, a citizen of the United States, residing at Washington, in the District of Columbia, have invented certain new and useful improvements in Kinetographic Apparatus, of which the following is a specification.

This invention relates to apparatus that operates kinetographically, using the term "kinetographic" in its most comprehensive sense; that is to say, the several forms of the apparatus write, either permanently or temporarily, successive phases of motion of objects.

Primarily, the apparatus is used to write in a permanent manner, to record on an image surface, such as a sensitized photographic tape-film, or the like, the successive phases of movement of an object in motion. Secondarily, the apparatus is used to exhibit, by projection or by direct view, the successive phases of motion recorded on the image surface, successively in such an intermittent manner as to apparently reproduce the object in motion.

This secondary use of the apparatus is of much more frequent employment than the other use mentioned above, as a record once made on the film, may be used in the projection apparatus a great many times; and, furthermore, the film may have a number of duplicate films made from it, to be used in as many other apparatus.

This invention is a modification of an invention of mine forming the subject matter of an application for letters patent of the United States, filed by me on the First day of October, 1900, and bearing Serial Number, 31,727.

The object of the present invention is to provide with a movable image surface, such as a film or ribbon, and movable reflecting means, means for moving the reflecting means bodily in an endless path. In the application above refered to, I set forth means for moving the reflecting means bodily in a reciprocating manner; in this application, I provide means for moving the reflecting means in a continuous manner, and bodily during part of its movement.

My invention, broadly stated, consists in using a continuously moving image surface, and one or more reflecting means, arranged to move bodily in an endless path, which reflecting means will cause an image to be reflected from the image surface onto the screen, or from an object in motion onto the sensitive image film, during the movement of the image surface for a certain distance; and then the reflecting means will travel through the remaining portion of the endless path, and returning to its former position, will, in the same manner, reflect another image. But I preferably use a series of reflecting means, which successively reflect the successive images, or phases of motion.

And my invention comprises such further details of construction and arrangement, either separately, or in combination, as will be described hereinafter, and then particularly pointed out in the claims, reference being had to the accompanying drawings, in which the numerals of reference indicate the same parts in the several views.

In the accompanying drawings, representing apparatus embodying my invention:—

Figure 1 is a vertical section on the line 1—1 of Figure 3.

Figure 2 is a horizontal section on the line 2—2 of Figure 1.

Figure 3 is a rear elevation of the apparatus shown in Figure 1.

Figure 4 is a vertical section through the pulleys shown in Figure 1, certain parts being shown in plan.

Figure 5 is a view similar to Figure 1, showing certain additional parts.

Figure 7 is a front elevation of the form shown in Figure 6.

Figure 8 is a section of the line 8—8 of Figure 6.

Figure 9 shows in reduced elevation the pulleys of Figure 6.

Figure 6:
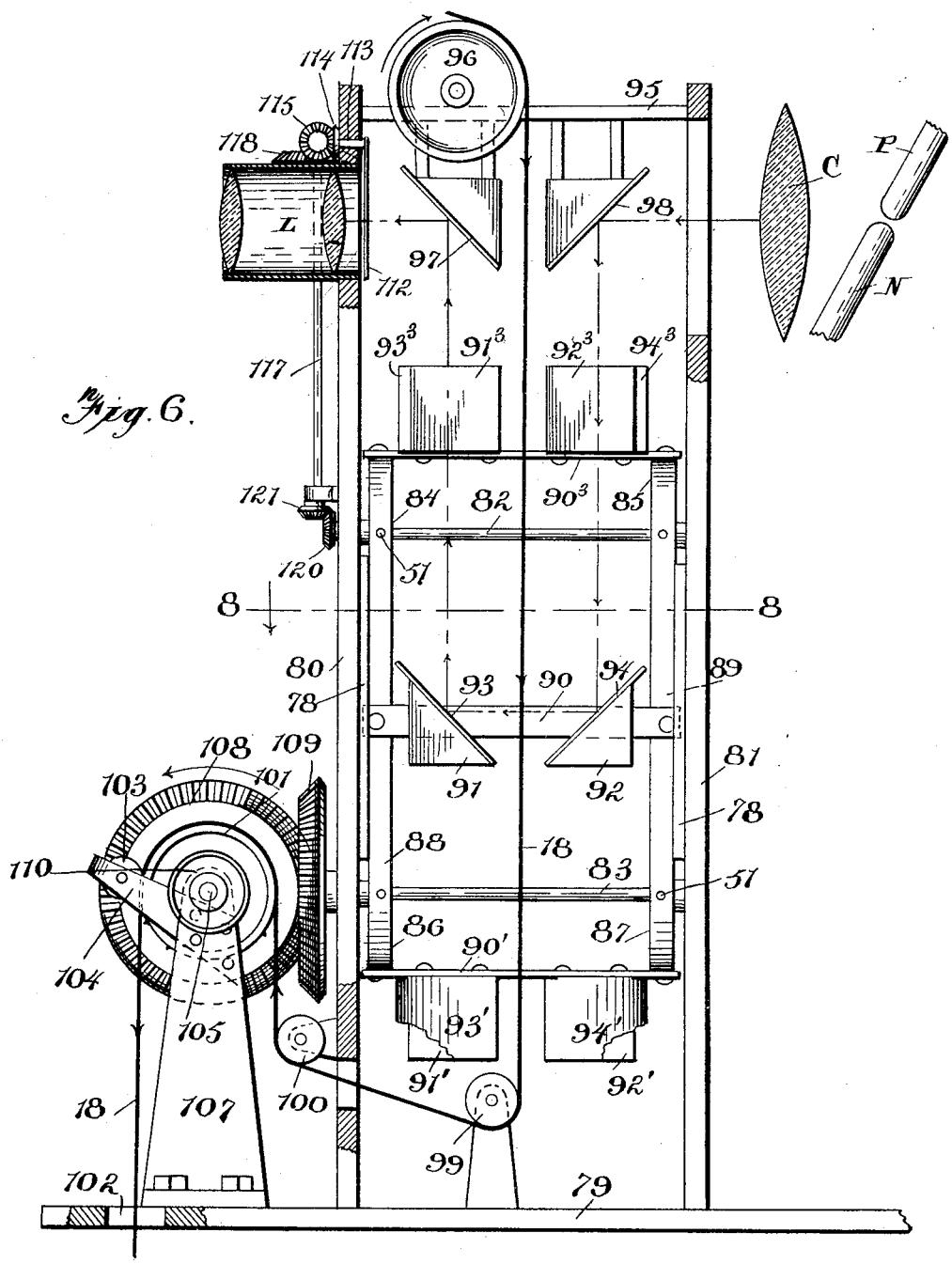
Figure 6 shows a modification, on the line 6—6 of Figure 7.

Referring now to Figures 1, 2, 3 and 4, the reference numeral 12, indicates a suitable base, on which is mounted a standard 13. At the upper part of this standard are secured a pair of hangers 14, 14', in which is journaled a drum 15. Another drum 16, is journaled in supports 17, 17', that are secured on the base.

The tape-film, or other form of image surface, 18, passes from any suitable supporting means, not shown, over the guide drum 15, thence downwards to the drum 16, by which latter it is actuated, preferably in a continuous manner. A small roller 19, journaled in the supports 17, 17', is arranged in close proximity to the lower part of the drum 16, and serves to retain the film in contact with the drum for a portion of the circumference of the latter. After passing between the roller and the drum, the film passes through a slot 20, in the base. It may then be received by a suitable receptacle, not shown, below the base.

The drum 16, may be rotated by a belt 21 from a pulley 22, that may be driven by any suitable source of power.

A pair of pulleys 23, 24, are secured on a shaft 25, which is mounted in bearing blocks 26, 27, secured on the standard 13, on opposite sides of an opening 13' therein. A similar pair of pulleys 28, 29, are secured on a shaft 30, which is mounted in bearing blocks 31, 32, secured on the standard 13, on opposite sides of an opening 13". The pulley 23, is arranged in vertical alignment with the pulley 28, and also the pulley 24, with the pulley 29.

An endless carrier, such as a chain, or a flexible band 33, preferably of metal, runs on the pulleys 23, and 28; and another such band 34, runs on the pulleys 24, and 29.

A rectangular frame 35, is secured transversely to each of the bands 33, 34, and carries a triangular block or frame 36, to which is fastened one of my reflecting means, preferably a plane reflector or mirror 37. I use preferably a plurality of these reflectors, 38, 39, and 40, arranged in series on the endless carrier formed by the bands 33, 34, and a series of rectangular frames 44, 45, and 46, which carry blocks 41, 42, and 43, respectively, and support the said reflectors, 38, 39, and 40. These four reflectors are arranged at an equal distance apart; and are placed at the same angle to the bands 33, 34, preferable at 45°. In order to prevent vibration of the bands and reflectors while passing through the rectilinear path adjacent to the film, the ends of the frame 35, slide in guides 47, 47', that are secured to the standard 13, by arms 48.

A gear 49, mounted on the shaft 16', of the drum 16, engages an equal sized gear 50, secured on the shaft 30; and as the four pulleys 23,—26, are each of equal diameter with the pulley 16, the film will travel at the same velocity as the adjacent portions of the bands 33, 34, and the adjacent reflectors; and also in the same direction as those reflectors. Lugs 51, on each of the pulleys engage apertures 52, in the bands 33, 34, and prevent slip of the bands on the pulleys.

A lens tube L, is secured to the upper part of the standard 13, and contains the projecting lens.

A stationary reflector 53, is secured to the hangers 14, 14', in vertical alignment with the reflector 37, when the latter is in the position shown in Figure 1. This reflector 53, is also in the axis of the lens, and at an angle of 45° therewith, and is parallel with the reflector 37, when the latter is in the said position.

A shutter 54, mounted on a pinion 55, that is rotatably mounted in the standard 13, serves to cut off the rays passing between the said lens and the reflector 53, during a part of each revolution that it makes. On the said pinion 55, is secured a bevel gear 56, engaging a bevel gear 57, secured on a horizontal shaft 58. A vertical shaft 59' has a bevel gear 60, on one end that engages a bevel gear 61, on the end of the said shaft 58. The shaft 25, has one end extended and carries a bevel gear 62, that engages a bevel gear 63, on the lower end of the shaft 59. Thus the shutter is operated from the shaft 25.

In Figure 5, is shown substantially the apparatus set forth in Figures 1, 2, 3 and 4, with the addition of another series of reflectors mounted on a similar endless carrier. In this form I use the standard 13, supporting the endless carrier having the reflectors 37,—40, as described with reference to the said Figures. The film 18, is guided and actuated in the same manner, and the carrier pulleys from the film drum, as hereinbefore described. Another standard 13ª, is mounted on the base parallel with the standard 13, and supports a duplicate of the carrier and reflectors supported by the standard 13; comprising four reflectors 67, 68, 69, and 70, mounted on a carrier running on a pulley system such as previously described with reference to Figures 1, 2, 3 and 4; and, hence, need not be further shown or described. These four reflectors are arranged on their carrier so that when moving adjacent to the film, they will make an angle of 45° therewith, and will be directly opposite the respectively adjacent reflectors 37, 38, 39, and 40.

A gear 50', secured to the lower shaft 30', of the pulley system on the standard 13ª, and corresponding to the gear 50, engages an equal sized gear 71, supported by the standard 13ª, which latter gear engages the gear 49; thus the reflectors adjacent to the film in each system will move in unison therewith.

Instead of the hangers 14, 14', I provide one or more cross arms 72, which support the guide pulley 15, and the stationary reflector 53; and also support another stationary reflector 73, that is arranged in alignment with, and parallel to, the reflector 57, when the latter is in the position shown in Figure 5.

The operation of my apparatus is as follows:—

Rays of light from any suitable source, such as an arc light, indicated by the carbons P, N, in Figure 1, are directed by a condenser C, parallel in a horizontal direction, and being intercepted by the reflector 37, will be deflected upwards in a vertical path. They will then be intercepted by the stationary reflector 53, which will deflect them into the lens, by which they will be projected onto a suitable screen, not shown.

Now if both the reflector 37, and the film are at rest, and an image be located on the film so that it is intersected by the rays that are intercepted by the reflector 37, the image would be reflected into the lens and by it projected onto the screen.

Next, suppose the reflector 37, to be in the position indicated by the dotted lines 37×, and to be moved downwards by the carrier to the position in which it is shown, 37. Since it travels in a vertical path between these two positions, it will maintain a constant angle of 45°, with the parallel rays from the condenser C, during this movement, and will deflect the intercepted rays upwards in a vertical path, and upon the reflector 53. And if an image on the film be located opposite this reflector when in the position indicated by 37×, and then the belt 22, be caused to drive the film and carriers, and move the film and reflector downwards in unison, as previously described, until the reflector arrives at the position of 37, it will be seen that the image and the reflector remain immovable relatively, and that rays of light perpendicular to the image are constantly projecting the image onto the reflector; therefore, this projection will be immovable on the reflector; that is to say, the points of incidence of the image on the reflector will remain stationary thereon. But, the projection will, of course, be deflected vertically upwards towards the reflector 53; and as these points of incidence on the reflector 37, all travel in a vertical path, the projection will be directed upwards in the same path during this movement of the reflector 37, and therefore will impinge on the stationary reflector 57, at the same points for every position of the reflector between the said positions; in fact, for every position of the reflector 37, in its rectilinear path adjacent to the film 18. Consequently, the reflector 53, will deflect the image into the lens in the same path during this entire movement; and the moving image will be held stationary on the screen.

But this result will follow only while the reflector is traveling in its rectilinear path. When the reflector 37, is about at the end of this movement, the shutter 54, that is so geared relative to the carrier that it makes four revolutions to one movement of the reflector through its endless path, cuts off the rays between the reflector and the lens for a short interval; during which period the next reflector 38, is moved by the carrier into the position indicated by 37×. Now the successive images on the film are arranged as far apart as are the reflectors on the carrier, and as the carrier and the film travel at the same speed, the image that has just been reflected by the reflector 37, has now passed downwards, and the next image on the film will be brought opposite to the reflector 38, now in the position of 37×; which latter image will be projected onto the screen, and will be held stationary thereon during the interval or period of illumination; that is, between the successive interceptions of the shutter 54, while the reflector is moving through its rectilinear path. And then there is another cutting off by the shutter, while the next reflector 39, and the next image on the film, come into position of action. This latter reflector will act as the previous ones; and then after another interception by the shutter, the next reflector 40, and another image on the film are brought into operation. And the next period of illumination will bring the reflector 37, again to the position of 37×, which will then repeat its reflection of an image as in the former case.

In the apparatus shown in Figure 5, the rays falling on the stationary reflector 73, are deflected by it vertically downwards and onto the movable reflector 67, This latter reflector deflects the rays horizontally, which, intersecting the film, fall upon the reflector 37; and the latter reflector will direct them vertically upwards onto the reflector 53, by which they are directed into the lens, and thence onto the screen, not shown, as will be readily understood.

If an image be located on the film between the now opposite reflectors, 67, and 37, it will be projected onto the screen, providing the reflectors are at rest in the position shown in Figure 5. But when the drum and gearing move the reflector 37, downwards to the position in which the reflector 40, is shown, and the film downwards in unison therewith, the reflector 67, will be moved downwards to the position in which the reflector 70, is shown, and it will travel in unison with the film and reflector 37. Therefore, as the rays impinging on the reflector 67, are all vertical, and as this reflector travels in a vertical path, while moving from the position shown to that of the reflector 70, these vertical rays will impinge on the reflector 67, at the same points and at the same angle during the whole of said movement. The result of which is that during the said movement, the image will be intersected and thus projected onto the screen by the same rays of light, instead of a different set of rays for each consecutive position, as is the case with the arrangement shown in Figure 1.

When the next reflector, 38, is brought into the position in which the reflector 37, is shown, the next reflector 68, of the other series, will be brought into the position in which the reflector 67, is shown; and the succeeding image on the film will be brought intermediate of these two reflectors, and be projected in the same manner as the previous one. And the next reflector 39, will act in conjunction with the next reflector 69, of the other series; and also the reflector 70, will act in conjunction with the reflector 40.

In Figures 6, 7, 8 and 9, I show a modification of the apparatus hereinbefore described, in which I arrange the reflectors in one or more pairs, that are located on opposite sides of the film, as set forth in Figure 5, but which are all mounted on a single carrier, instead of on two carriers, as shown in that Figure.

Two standards 80, and 81, are mounted on a suitable base 79, parallel with each other. A pair of shafts 82, and 83, each have one end journaled in the standards 80, 81, and arranged parallel with each other, and one vertically above the other. The shaft 82, has a pair of pulleys 84, 85, mounted on it; and the shaft 83, has also a pair of pulleys 86, 87, mounted on it: the pulley 84, being in vertical alignment with the pulley 86, and the pulley 85, with the pulley 87. An endless flexible band 88, runs on the pulleys 84, and 86; and another such band 89, on the pulleys 85, 87.

An arm 90, extending transversely from one of the said bands to the other, has mounted thereon a pair of blocks or frames 91, 92, that support reflectors 93, 94, respectively. I preferably use a plurality of such pairs of reflectors, arranged in series, on the endless carriers formed by the bands 88, 89, and the series of arms $90'$, $90^2$, and $90^3$, which carry blocks $91'$, $92'$; $91^2$, $92^2$; and $91^3$, $92^3$, respectively: and these pairs of blocks support the pairs of reflectors $93'$, $94'$; $93^2$, $94^2$; and $93^3$, $94^3$, respectively. These four pairs of reflectors are arranged in series on the endless carrier, at an equal distance apart, and are all placed at an angle of 45° with the carrier.

In order to prevent vibration of the carrier when moving adjacent to the film 18, the ends of the arms 90, etc., slide in vertical guides 78, secured to the standards 80, and 81.

One or more cross arms 95, are secured at their ends to the standards 80, 81, and support a guide pulley 96, and also a pair of stationary reflectors 97, 98; which latter correspond in position and function to the reflectors 53, and 73, shown in Figure 5.

The film 18, passes from any suitable support, not shown, over the guide pulley 96, then vertically downwards and between the reflectors 93, and 94, when they are in the position shown in Fig. 6; then around a guide pulley 99, that is supported from the base; then over another guide pulley 100; and finally around an actuating drum 101, from which it passes downwards through a slot 102, in the base, into any suitable receptacle, not shown, below the base.

The said drum 101, is secured on a shaft 105, journaled in supports 106, 107, that are mounted on the base. This shaft carries a bevel gear 108, that engages a similar gear 109, secured on the shaft 83; by which means the film and the pair of reflectors adjacent to the film are caused to move in unison. A small roller 103, carried by a bent arm 104, that is secured to the standard 106, serves to retain the film in contact with the drum 101, for about half of its periphery.

A pulley 110, is secured to an extension of the shaft 105, which may be rotated by a belt 111, that is driven from any suitable source of power, not shown.

A shutter 112, secured to a pinion 113, that is rotatably mounted in the standard 80, serves to cut off the rays passing between the lens and the reflector 97, during part of each revolution that it makes. On the pinion 113, is secured a bevel gear 114, engaging a bevel gear 115, that is secured on a short horizontal shaft 116. A vertical shaft 117, has a bevel gear 118, secured on one end that engages a bevel gear 119, secured on the end of the shaft 116. The shaft 82, has one end extended and carries thereon a bevel gear 120, that engages a bevel gear 121, secured on the lower end of the shaft 117. Thus the shutter 112, is operated from the shaft 82.

The parallel rays from the condenser C, of Figure 6, are deflected by the reflector 98, vertically downwards and are intercepted by the reflector 94, when the latter is in the position shown, and are caused to intersect the film 18, and then fall upon the reflector 93; which latter reflector will direct them vertically upwards upon the reflector 97, from which they pass into the lens and then out onto the screen, not shown.

While the reflectors 93, and 94, are passing downwards in their rectilinear path adjacent to the film, and the film is moving in unison with them, and has an image intercepted by the rays passing from the reflector 94, to the reflector 93, the image will be projected onto the screen; in the manner as particularly described with reference to Figure 5. When this pair of reflectors reach the lower part of their movement in this rectilinear path, the shutter 112, intervenes and cuts off the rays from the lens, as in the previously described manner. Then this pair of reflectors pass to the position indicated by $93'$, $94'$, and the next pair $93^3$, $94^3$, are brought by the carrier into the upper part of the rectilinear path adjacent to the film; when the latter pair of reflectors will have the next image on the film located between them, and will project this image onto the screen, in the above described manner.

While I have herein shown and described my apparatus as used for the projection of images contained on a transparent tape-film, if the light and the reflectors between it and the film were removed, and a sensitized film put in place of the image film 18, the lens could be focused on a moving object, which would cause a series of images of the successive phases of motion of the object to be received on the film; that could be made permanent by proper photographic treatment. The apparatus would have to be enclosed in a light-tight case; and a properly timed shutter used instead of the one shown.

Or my apparatus may be used as a direct-view machine, by placing the eyes in the path of the rays coming from the reflector 53, (or 97). And, instead of the transparent film, an opaque ribbon or image surface may be used, and, the apparatus not being enclosed, the images would be illuminated by ordinary daylight, which would direct the images onto the reflector 53, (or 97), by reflected instead of by transmitted light.

By the term "image surface" as herein used, I mean either a sensitized photographic surface for receiving and recording the images of the successive phases of motion, or a surface on which such images have been recorded, the latter surface being either translucent or opaque.

Where the expression "bodily movable" is herein employed with reference to the movement of the reflecting means, I refer to a movement of the same in which every point is given a movement of translation, that is to say, a movement in which the distance of every point in the reflecting means from every fixed point varies; in contradistinction to a movement of rotation, or of oscillation, in which latter movements every point in the reflecting means remains at a constant distance from a fixed axis.

Having thus described my invention, what I claim is:—

1. In an apparatus of the character described, the combination of means for projecting rays of light in a certain path, movable reflecting means arranged to travel in an endless path in such a manner that during the periods of illumination the reflecting means moves bodily and intercepts said rays and thereby causes them to travel in another path, a movable image surface arranged to intersect the rays traveling in one of said paths, and means for moving said reflecting means.

2. In an apparatus of the character described, the combination of a movable image surface, means for causing rays of light to intersect an image contained on said surface and thereby project the image, movable reflecting means arranged to travel in an endless path in such a manner that during the periods of illumination the reflecting means moves bodily and intercepts said projection and thereby causes it to travel in another path, and means for moving said reflecting means.

3. In an apparatus of the character described, the combination of means for projecting rays of light in a certain path, movable reflecting means arranged to travel in an endless path in such a manner that during part of its movement it moves bodily and intercepts said rays and thereby causes them to travel in another path, said reflecting means being also arranged to move in such a manner that the angle which the reflecting means makes with the reflected rays remains constant during the periods of illumination, a movable image surface arranged to intersect the rays traveling in one of said paths, and means for moving said reflecting means.

4. In an apparatus of the character described, the combination of means for projecting rays of light in a certain path, movable reflecting means arranged to travel in an endless path in such a manner that during part of its movement it moves bodily and intercepts said rays and thereby causes them to travel in another path, a movable image surface arranged to intersect the rays traveling in one of said paths, said reflecting means being also arranged to move in such a manner that during the periods of illumination it travels in the said path of rays not intersected by said image surface, and means for moving said reflecting means.

5. In an apparatus of the character described, the combination of means for projecting rays of light in a certain path, movable reflecting means arranged to travel in an endless path in such a manner that during part of its movement it moves bodily and intercepts said rays and causes them to travel in a path at right angles to said certain path, said reflecting means being also arranged to move in such a manner that the angle which the reflecting means makes with the reflected rays remains constant during the periods of illumination, a movable image surface arranged to intersect the rays traveling in one of said paths, and means for moving said reflecting means.

6. In an apparatus of the character described, the combination of means for projecting rays of light in a certain path, movable reflecting means arranged to travel in an endless path in such a manner that during part of its movement it moves bodily and intercepts said rays and thereby causes them to travel in another path, said reflecting means being also arranged to move in such a manner that the angle which the reflecting means makes with the reflected rays remains constant during the periods of illumination, a movable image surface arranged to intersect the rays traveling in one of said paths, said image surface being arranged to move in a path at right angles to the path of rays it intersects, and means for moving said reflecting means.

7. In an apparatus of the character described, the combination of means for projecting rays of light in a certain path, movable reflecting means arranged to travel in an endless path in such a manner that during part of its movement it moves bodily and intercepts said rays and thereby causes them to travel in another path, a movable image surface arranged to intersect the rays traveling in one of said paths, means for moving said image surface in a certain direction, said reflecting means being also arranged to move in such a manner that during the periods of illumination it moves in substantially the same direction as said moving image surface, and means for moving said reflecting means.

8. In an apparatus of the character described, the combination of means for projecting rays of light in a certain path, movable reflecting means arranged to travel in an endless path in such a manner that during part of its movement it moves bodily and intercepts said rays and thereby causes them to travel in another path, a movable image surface arranged to intersect the rays traveling in one of said paths, means for moving said image surface in a certain direction, said reflecting means being also arranged to move in such a manner that during the periods of illumination it remains immovable relative to said moving image surface, and means for moving said reflecting means.

9. In an apparatus of the character described, the combination of means for projecting rays of light in a certain path, movable reflecting means arranged to travel in an endless path, said reflecting means being arranged to move bodily during part of its movement and to intercept said rays and thereby cause them to travel in another path, a movable image surface arranged to intersect the rays traveling in one of said paths, means for moving said image surface, and means for moving said reflecting means, the movement of said image surface relative to the movement of said reflecting means being so arranged that during the periods of illumination the points of the said intersection of the rays with the image surface remain unchanged.

10. In an apparatus of the character described, the combination of means for projecting rays of light in a certain path, movable reflecting means arranged to travel in an endless path, said reflecting means being arranged to move bodily during part of its movement in said path and to intercept said rays and thereby cause them to travel in another path, means for moving said reflecting means, a movable image surface arranged to intersect the rays traveling in one of said paths, and means for moving said image surface in such a manner that the angle of the said intersection of the image surface with the path of rays remains constant during the periods of illumination.

11. In an apparatus of the character described, the combination of means for projecting rays of light in a certain path, movable reflecting means arranged to travel in an endless path in such a manner that during part of its movement it moves bodily and intercepts said rays and thereby causes them to travel in another path, said reflecting means being also arranged to move in such a manner that the angle which the reflecting means makes with the reflected rays remains constant during the periods of illumination, a movable image surface arranged to intersect the rays traveling in one of said paths, means for moving said image surface continuously, and means for moving said reflecting means.

12. In an apparatus of the character described, the combination of a movable image surface, means for causing rays of light to intersect an image contained on said surface and thereby project the image, movable reflecting means arranged to travel in an endless path in such a manner that during part of its movement it moves bodily and intercepts said projection and thereby causes it to travel in another path, said reflecting means being also arranged to move in such a manner that the angle which the reflecting means makes with the reflected rays remains constant during the period of illumination, and means for moving said reflecting means.

13. In an apparatus of the character described, the combination of a movable image surface, means for causing rays of light to intersect an image contained on said surface and thereby project the image, movable reflecting means arranged to travel in an endless path in such a manner that during part of its movement it moves bodily and intercepts said projection and thereby causes it to travel in another path, said reflecting means being also arranged to move in such a manner that during the periods of illumination it travels in the path of the reflected rays, and means for moving said reflecting means.

14. In an apparatus of the character described, the combination of means for projecting rays of light in a certain path, a plurality of movable reflecting means arranged to move bodily during part of their movement and successively intercept said path and thereby cause said rays to travel in another path, said reflecting means being also arranged to move in such a manner that the angle which the said intercepting reflecting means makes with the reflected rays remains constant during the periods of illumination, a movable image surface arranged to intersect the rays traveling in one of said paths, and means for moving said reflecting means.

15. In an apparatus of the character described, the combination of means for projecting rays of light in a certain path, a plurality of movable reflecting means arranged to move bodily during part of their movement and successively intercept said path and thereby cause said rays to travel in another path, a movable image surface arranged to intersect the rays traveling in one of said paths, said reflecting means being also arranged to move in such a manner that the said intercepting reflecting means during the periods of illumination moves in the said path of rays not intersected by said image surface, and means for moving said reflecting means.

16. In an apparatus of the character described, the combination of a movable image surface, means for causing rays of light to intersect the images contained on said surface and thereby project the images, a plurality of movable reflecting means arranged to move bodily during part of their movement and intercept said projections and thereby cause them to travel in another path, said reflecting means being also arranged so as to intercept in succession the said successive projections in such a manner that the angle which the said intercepting reflecting means makes with the reflected rays remains constant during the periods of illumination, and means for moving said reflecting means.

17. In an apparatus of the character described, the combination of a movable image surface, means for moving said image surface, means for causing rays of light to intersect the images contained on said surface and thereby project the images, a plurality of movable reflecting means arranged to move bodily during part of their movement and intercept said projections and thereby cause them to travel in another path, said reflecting means being also arranged so as to intercept in succession the said successive projections in such a manner that during the periods of illumination the said intercepting reflecting means moves in the path of the reflected rays, and means for moving said reflecting means.

18. In an apparatus of the character described, the combination of means for projecting rays of light in a certain path, a plurality of movable reflecting means arranged to travel in an endless path in such a manner that during part of their movement they move bodily and successively intercept said rays and thereby cause them to travel in another path, said reflecting means being also arranged to move in such a manner that the angle which the said intercepting reflecting means makes with the reflected rays remains constant during the periods of illumination, a movable image surface arranged to intersect the rays traveling in one of said paths, and means for moving said reflecting means.

19. In an apparatus of the character described, the combination of means for projecting rays of light in a certain path, a plurality of movable reflecting means arranged to travel in an endless path in such a manner that during part of their movement they move bodily and successively intercept said rays and thereby cause them to travel in another path, a movable image surface arranged to intersect the rays traveling in one of said paths, the said reflecting means being also arranged to move in such a manner that during the periods of illumination the said intercepting reflecting means travels in the path of rays not intersected by said image surface, and means for moving said reflecting means.

20. In an apparatus of the character described, the combination of a movable image surface, means for moving said image surface, means for causing rays of light to intersect the images contained on said surface and thereby successively project the images, a plurality of movable reflecting means arranged to travel in an endless path and to move bodily during part of their movement and successively intercept said projections thereby causing them to travel in another path, the said reflecting means being also arranged to move in such a manner that the angle which the said intercepting reflecting means makes with the reflected rays remains constant during the periods of illumination, and means for moving said reflecting means.

21. In an apparatus of the character described, the combination of a movable image surface, means for moving said image surface, means for causing rays of light to intersect the images contained on said image surface and thereby successively project the images, a plurality of movable reflecting means arranged to travel in an endless path and to move bodily during part of their movement and successively intercept said projections thereby causing them to travel in another path, the said reflecting means being also arranged to move in such a manner that during the periods of illumination the said intercepting reflecting means moves in the path of the reflected rays, and means for moving said reflecting means.

22. In an apparatus of the character described, the combination of means for projecting rays of light in a certain path, an endless carrier having reflecting means mounted thereon, said carrier being arranged to move in such a manner that during part of its movement the reflecting means moves bodily and intercepts said rays and thereby reflects them into another path, said carrier being also arranged to move in such a manner that the angle which the said reflecting means makes with the said reflected rays remains constant during the periods of illumination, a movable image surface arranged to intersect the rays traveling in one of said paths, and means for moving said carrier.

23. In an apparatus of the character described, the combination of means for projecting rays of light in a certain path, an endless carrier having reflecting means mounted thereon, said carrier being arranged to move in such a manner that during part of its movement the reflecting means moves bodily and intercepts said rays and thereby causes them to travel in another path, a movable image surface arranged to intersect the rays traveling in one of said paths, said carrier being also arranged to move in such a manner that during the periods of illumination the said reflecting means moves in the said path of rays not intersected by said image surface, and means for moving said carrier.

24. In an apparatus of the character described, the combination of a movable image surface, means for causing rays of light to intersect an image contained on said surface and thereby project the image, an endless carrier having reflecting means mounted thereon, said carrier being arranged to move in such a manner that during part of its movement the said reflecting means moves bodily and intercepts said projection and thereby reflects it into another path, said carrier being also arranged to move in such a manner that the angle which the said reflecting means makes with the reflected rays remains constant during the periods of illumination, and means for moving said carrier.

25. In an apparatus of the character described, the combination of a movable image surface, means for causing rays of light to intersect an image contained on said surface and thereby project the image, an endless carrier having reflecting means mounted thereon, said carrier being arranged to move in such a manner that during part of its movement the said reflecting means moves bodily and intercepts said projection and thereby reflects it into another path, said endless carrier being also arranged to move in such a manner that during the periods of illumination the said reflecting means moves in the path of the reflected rays, and means for moving said carrier.

26. In an apparatus of the character described, the combination of means for projecting rays of light in a certain path, an endless carrier having reflecting means mounted thereon, said carrier being arranged to travel in such a manner that during part of its movement the said reflecting means moves in a rectilinear direction and intercepts said rays and thereby directs them in another path, said carrier being also arranged to move in such a manner that the angle which the said reflecting means makes with the reflected rays remains constant during the periods of illumination, a movable image surface arranged to intersect the rays traveling in one of said paths, and means for moving said carrier.

27. In an apparatus of the character described, the combination of means for projecting rays of light in a certain path, an endless carrier having reflecting means mounted thereon, said carrier being arranged to travel in such a manner that during part of its movement the said reflecting means moves in a rectilinear direction and intercepts said rays and thereby reflects them into another path, a movable image surface arranged to intersect the rays traveling in one of said paths, said carrier being also arranged to move in such a manner that during the periods of illumination the said reflecting means moves in the said path of rays not intersected by said image surface, and means for moving said carrier.

28. In an apparatus of the character described, the combination of a movable image surface, means for causing rays of light to intersect an image contained on said surface and thereby project the image, an endless carrier having reflecting means mounted thereon, said carrier being arranged to travel in such a manner that during part of its movement the said reflecting means moves in a rectilinear direction and intercepts said projection and thereby reflects it into another path, said carrier being also arranged to move in such a manner that the angle which the said reflecting means makes with the reflected rays remains constant during the periods of illumination, and means for moving said carrier.

29. In an apparatus of the character described, the combination of a movable image surface, means for causing rays of light to intersect an image contained on said image surface and thereby project the image, an endless carrier having reflecting means mounted thereon, said carrier being arranged to travel in such a manner that during part of its movement the said reflecting means moves in a rectilinear direction and intercepts said projection and thereby projects it into another path, said endless carrier being also arranged to move in such a manner that during the periods of illumination the said reflecting means moves in the path of the reflected rays, and means for moving said carrier.

30. In an apparatus of the character described, the combination of a pair of movable reflectors arranged to travel in an endless path, said reflectors being arranged to move bodily during part of their movement in said path, means for projecting rays of light in a certain path, one of said reflectors being arranged to receive said rays during the periods of illumination and direct them towards said other reflector, said latter reflector being arranged to receive said reflected rays and direct them in a path parallel with the said rays falling on said former reflector, means for moving said reflectors in such a manner that during the periods of illumination they maintain a constant angle with said parallel rays, a movable image surface, and means for moving the image surface during the periods of illumination in a path intersecting the said rays passing between the said reflectors.

31. In an apparatus of the character described, the combination of an endless carrier having a pair of reflectors mounted thereon, said carrier being arranged to move said reflectors bodily during part of its movement, means for projecting rays of light in a certain path, one of said reflectors being arranged to receive said rays of light during the periods of illumination and direct them towards said other reflector, said latter reflector being arranged to receive said reflected rays and direct them in a path parallel with said rays falling on said former reflector, means for moving said carrier in such a manner that during the periods of illumination the said reflecting means maintain a constant angle with said parallel rays, a movable image surface, and means for moving the image surface during the periods of illumination in a path intersecting the said rays passing between the said reflectors.

32. In an apparatus of the character described, the combination of an endless carrier having a series of pairs of reflectors mounted thereon, said carrier being arranged to successively move said reflectors bodily during part of its movement, means for projecting rays of light in a certain path, said carrier being arranged to move said pairs of reflectors in such a manner that the pairs successively intercept said rays of light and deflect them into another path, said reflectors in each of said pairs being so arranged that during the periods of illumination one of said reflectors will receive said rays of light and direct them towards said other reflector, said latter reflector being arranged to receive said deflected rays and direct them in a path parallel with the said rays falling on said former reflector, means for moving said carrier in such a manner that during the periods of illumination the said successive intercepting pairs of reflectors maintain a constant angle with said parallel rays, a movable image surface, and means for moving the image surface during the periods of illumination in a path intersecting the rays passing between the said intercepting reflectors.

33. In an apparatus of the character described, the combination of a pair of movable reflectors arranged to travel in an endless path, said reflectors being arranged to move bodily during part of their movement in said path, means for projecting rays of light in a certain path, a stationary reflector arranged to receive said rays and deflect them into another path, one of said movable reflectors being arranged to receive the rays of light from said stationary reflector during the periods of illumination and direct them towards said other movable reflector, said latter movable reflector being arranged to receive said latter reflected rays and direct them in a path parallel with said rays falling on said former movable reflector, a second stationary reflector arranged to receive said rays from said latter movable reflector and direct them in another path, means for moving said reflectors in such a manner that during the periods of illumination they maintain a constant angle with said parallel rays, a movable image surface, and means for moving the image surface during the periods of illumination in a path intersecting the said rays passing between the said movable reflectors.

34. The combination of a movable image surface, movable reflecting means arranged to travel in an endless path, said reflecting means being arranged to move bodily during part of its movement in said path, means for moving said image surface, and means for causing said latter means to move said reflecting means.

35. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, reflecting means mounted on said carriers, means for moving said image surface, and means for causing said latter means to drive one of said shafts and thereby move said reflecting means.

36. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, reflecting means mounted on said carriers, means for guiding said reflecting means in a rectilinear path during part of its movement, means for moving said image surface, and means for causing said latter means to drive one of said shafts and thereby move said reflecting means.

37. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, reflecting means mounted on said carriers, means for moving said image surface, and means for causing said latter means to drive one of said shafts in such a manner that the said reflecting means moves at the same velocity as said moving image surface.

38. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, a plurality of reflecting means mounted on said carriers, means for moving said image surface, and means for causing said latter means to drive one of said shafts and thereby move said reflecting means.

39. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, a series of reflecting means mounted on said carriers, means for moving said image surface, and means for causing said latter means to drive one of said shafts and thereby move said reflecting means.

40. The combination of a movable image surface, a rotatable shaft having a pair of pulleys mounted thereon, a second rotatable shaft, a pair of pulleys mounted on said second shaft, a pair of endless carriers, each of the carriers engaging one of the pulleys of each of said pairs, reflecting means mounted on said carriers, a rotatable drum arranged to move said image surface, a gear wheel connected with said drum, and a gear wheel mounted on one of said shafts and arranged to engage the said gear wheel connected with the drum.

In testimony whereof I affix my signature in the presence of two witnesses.

WILLIAM H. REID.

Witnesses:
M. C. MASSIE,
GEO. E. FRECH.